US012264300B2

(12) United States Patent
Lebrun

(10) Patent No.: US 12,264,300 B2
(45) Date of Patent: Apr. 1, 2025

(54) COMPRESSED SOLID COMPOSITION FOR NON-ORAL USE

(71) Applicant: LESAFFRE ET COMPAGNIE, Paris (FR)

(72) Inventor: Xavier Lebrun, Marquette-Lez-Lille (FR)

(73) Assignee: LESAFFRE ET COMPAGNIE, Paris (FR)

( * ) Notice: Subject to any disclaimer, the term of this patent is extended or adjusted under 35 U.S.C. 154(b) by 0 days.

(21) Appl. No.: 18/363,141

(22) Filed: Aug. 1, 2023

(65) Prior Publication Data

US 2023/0374421 A1 Nov. 23, 2023

Related U.S. Application Data

(63) Continuation of application No. 16/768,808, filed as application No. PCT/EP2018/083232 on Nov. 30, 2018, now Pat. No. 11,760,961.

(30) Foreign Application Priority Data

Dec. 1, 2017 (FR) ...................................... 17 61555

(51) Int. Cl.

*C11D 3/38* (2006.01)
*C11D 7/44* (2006.01)
*C11D 11/00* (2006.01)
*C11D 17/00* (2006.01)
*C11D 17/06* (2006.01)

(52) U.S. Cl.

CPC ............ *C11D 7/44* (2013.01); *C11D 11/0082* (2013.01); *C11D 17/0091* (2013.01); *C11D 2111/14* (2024.01)

(58) Field of Classification Search

None
See application file for complete search history.

(56) References Cited

U.S. PATENT DOCUMENTS

| | | | | |
|---|---|---|---|---|
| 4,994,100 | A * | 2/1991 | Sutton | C05G 3/90 71/30 |
| 5,009,671 | A | 4/1991 | Franke et al. | |
| 8,389,459 | B2 | 3/2013 | Baldridge et al. | |
| 2005/0271739 | A1 | 12/2005 | Wang | |
| 2007/0190625 | A1 | 8/2007 | Higa | |
| 2012/0255334 | A1 | 10/2012 | Gans | |
| 2014/0053508 | A1 | 2/2014 | Chourey et al. | |

FOREIGN PATENT DOCUMENTS

| | | | |
|---|---|---|---|
| CN | 1062892 | A | 7/1992 |
| CN | 103183530 | A | 7/2013 |
| CN | 104030768 | A | 9/2014 |
| CN | 104844306 | A | 8/2015 |
| CN | 105732226 | A | 7/2016 |
| CN | 106212911 | A | 12/2016 |
| CN | 106380359 | A | 2/2017 |
| CN | 107056478 | A | 8/2017 |
| EP | 0467739 | A1 | 1/1992 |
| EP | 1048716 | A1 | 11/2000 |
| FR | 1211066 | A | 3/1960 |
| JP | S51118669 | A | 10/1976 |
| JP | S5849796 | A | 3/1983 |
| JP | 2001019577 | A | 1/2001 |
| JP | 2002047087 | A | 2/2002 |
| JP | 2010120814 | A | 6/2010 |
| JP | 2011025137 | A | 2/2011 |
| KG | 147 | C2 | 10/1996 |
| KR | 100198727 | B1 | 6/1999 |
| KR | 101565506 | B1 | 11/2015 |
| RU | 2069200 | C1 | 11/1996 |
| WO | 2005/068603 | A1 | 7/2005 |

OTHER PUBLICATIONS

KR 101343133 B1 (Year: 2013) (with English Translation).*
CN 106380359-A (Year: 2017) (English Translation).*
Garcia-Trinanes, P. et al., "Use of organic byproducts as binders in the roll compaction of caustic magnesia", 2012, Power Technology, vol. 226, pp. 173-179.
International Search Report issued on Mar. 1, 2019 in corresponding International Application No. PCT/EP2018/083232; 6 pages.
Office Action issued on Oct. 27, 2021, in connection with corresponding Indian Application No. 202017022069 (5 pp., including English translation).
Office Action issued on Oct. 15, 2021, in connection with corresponding Russian Application No. 2020121589 (21 pp., including English translation).
Office Action issued on Mar. 23, 2021, in connection with corresponding Chinese Application No. 201880003752.X; 7 pages.

* cited by examiner

*Primary Examiner* — Lorna M Douyon
(74) *Attorney, Agent, or Firm* — Maier & Maier, PLLC

(57) ABSTRACT

A novel binder and/or disintegrant for obtaining a compressed solid composition for non-oral use, the binder and/or disintegrant being fermented molasses, a process for preparing the compressed solid composition and also a binding and/or disintegrating composition, which includes at least fermented molasses. The fermented molasses advantageously makes it possible to replace synthetic binders conventionally used in compressed solid compositions, while also being able to act as a disintegrant on contact with a liquid, especially water. Thus, a novel way is proposed for utilizing a product which was hitherto solely used in the field of agriculture and livestock farming.

19 Claims, No Drawings

COMPRESSED SOLID COMPOSITION FOR NON-ORAL USE

CROSS-REFERENCE TO RELATED APPLICATIONS

The present application is a continuation of U.S. application Ser. No. 16/768,808, filed on Jun. 1, 2020, which is a national stage of International Application No. PCT/EP2018/083232, filed on Nov. 30, 2018, and claims priority from French Application No. 17 61555, filed on Dec. 1, 2017, the content of each of which is hereby incorporated by reference into this application.

FIELD

The present invention relates to a novel binder and/or disintegrant for obtaining a compressed solid composition for non-oral use, and also a process for preparing said compressed solid composition.

BACKGROUND

Compressed solid compositions may be in many forms which are generally decided by the targeted use, in order to obtain particular properties and to ensure optimum handling. Indeed, for some applications it is important for a compressed solid composition to have good integrity before use while also having the ability to rapidly disintegrate during use, especially on contact with a liquid. These properties are generally provided by binders and/or disintegrants.

The use of binders makes it possible to give the compressed solid compositions, also referred to as agglomerates, a sufficient level of mechanical strength to avoid problems of fine particle formation during the handling thereof or the use thereof. The advantages of using a binder are generally observed for all known techniques of compression or agglomeration, such as, for example, pressure compaction, pelletization, granulation, nodulizing, extrusion or else spray-drying. As for disintegrants, they enable the compressed solid compositions containing them to disintegrate on contact with a liquid, and especially on contact with water.

Finally, some agents are termed binders and disintegrants as they make it possible to obtain a sufficient level of mechanical strength in a dry medium while also affording the possibility of disintegration on contact with a liquid.

Generally speaking, numerous binders are known to those skilled in the art. Mention may be made, by way of example, of polyvinyl alcohols and derivatives thereof, celluloses and derivatives thereof, lignosulfonates, starches and derivatives thereof, alkali metal silicates, cement, clays and finally molasses, by combining the latter with lime.

Polyvinyl alcohols and derivatives thereof, celluloses and derivatives thereof, starches and physically and/or chemically modified starches have good binding properties and make it possible to obtain agglomerates which meet the requirements of agglomeration techniques but do not necessarily meet economic requirements. This is because the usage doses required do not generally make it possible to obtain agglomerates or compressed solid compositions under economically satisfactory conditions.

Lignosulfonates have the drawback of being aggressive due to their pH and their composition with regard to the agglomeration means used. Moreover, during combustion or during the stoving operations required in the course of compression processes, lignosulfonates may lead to the release of harmful vapours rich in sulfuric acid. The result of this is that lignosulfonates represent a not inconsiderable cause of atmospheric pollution and corrosion. In the context of developing greener products with reduced environmental impact, lignosulfonates should therefore be avoided.

Clays are low-cost products having binding properties, but their field of application is limited. In addition, it is very often necessary to combine them with other binders. Mention may be made, by way of example, of starchy products and derivatives thereof.

As for alkali metal silicates, they require delicate handling and the prolonged use thereof entails frequent cleaning of the facilities in which they are used.

The types of binders used in compositions vary depending on the final application. For example, in the field of tablets and solid compositions for detergent use, the binders used are generally synthetic binders.

For example, document EP 1 048 716 describes a laundry detergent composition having the form of a tablet, comprising especially clay and a surfactant. The tablet is in the form of a compressed mass of particles held together by a binder that has less of a dispersing effect on the clay than polyethylene glycol 6000 (PEG 6000) does. Specifically, the binder is a chemical binder chosen from polyethylene glycols having a molecular weight of less than 1500, amine oxide and polyvinylpyrrolidone.

Document WO 2005/068603 describes tablets with improved breaking strength and also a process for producing same. The process comprises a step of providing a binder having a shear modulus value G of 10 to 100 GPa, a phase angle value 6 of at least 7 degrees and a boiling point of at least 45° C. at atmospheric pressure. The process then comprises a step of heating the binder beyond the boiling point thereof, followed by a step of applying said heated binder to a powder containing a pre-mix of detergent compounds so as to form a detergent composition. The final step of the process consists in converting the detergent composition into a tablet. The binder used is chosen from the group consisting of anionic surfactants, non-anionic surfactants, polymeric materials, polyols, sugar acids, sugar alcohols, sugar esters, fatty acids, fatty acid esters, fatty acid amides and mixtures thereof.

Aside from the fact that they are of synthetic origin, another drawback of the available binders arises from their main advantage. This is because these agents make it possible to obtain aggregates by providing cohesion such that it is generally not possible to disintegrate them by contact with a liquid such as water.

Thus, there is a need for novel binders for the production of compressed solid compositions for non-oral use, said binders being able to replace the synthetic binders conventionally used and also being able to act as disintegrants on contact with a liquid, especially water.

It is therefore to the Applicant's credit to have found that this objective could be met surprisingly, and against all expectations, via fermented molasses, while the latter had hitherto been considered to be a residue from fermentation with the sole benefit of being utilized in the field of agriculture and livestock farming as fertilizer for spreading or as animal feed.

SUMMARY

A first subject of the invention relates to a compressed solid composition for non-oral use, comprising fermented molasses as binder and/or disintegrant.

Generally speaking, molasses is a substance known to those skilled in the art. It is a co-product of the production of sugar from beet and cane in sugar making or brown sugars in refining. The process of producing sugar, whether from cane or beet, leads, after the crystallization step, to obtaining sugar on the one hand and molasses on the other. Generally speaking, it is widely acknowledged that sugar making processes generate approximately 35 to 40 kilos of molasses per tonne of beet and from 30 to 35 kilos of molasses per tonne of cane. Even just on the French national level, annual production amounts to several tens of thousands of tonnes.

In terms of composition, the solids content of molasses does not vary very much and is commonly between 70% and 76%. Molasses have very low contents of crude celluloses and fatty substances, or even do not contain any at all.

As co-product of the production of sugar, molasses contain large amounts of sugars. The total sugars content is substantially the same regardless of the origin of the molasses, and is generally between 58% and 70% of the dry weight (DW), but has some differences depending on the industrial process applied to the beet molasses.

On the other hand, depending on the origin of the molasses, beet or cane, while the content of sugars is close, the composition of these total sugars is quite different. Thus, in beet molasses, virtually all of the sugars are in the form of sucrose, while in cane molasses, sucrose only represents approximately ⅔ of the total sugars, i.e. 30% to 40% of the crude product.

Molasses is a highly viscous substance, representing a drawback for the transport and storage thereof. However, this high viscosity constitutes an advantage for animal feed and they are generally used to feed ruminants and horses, in a mixture with straw or other cellulose-based feed such as bran, or as binder in complete feed, or even to promote the consumption of unappetizing feed. Indeed, by virtue of the presence of sugars, amino acids and salts, molasses constitutes feed, the flavour and odour of which stimulate the appetite and promote digestion for animals.

As an alternative to animal feed, molasses are also used by manufacturers for producing products referred to as "valuable" products via fermentation processes. Indeed, using the fermentation mechanisms of some microorganisms, molasses make it possible to obtain baker's yeast, ethyl alcohol, citric and glutamic acids, lysine or else antibiotics, and also generate liquid fermentation residues which correspond to fermented molasses.

Fermented molasses was hitherto considered to be a residue of fermentation, the only benefit of which was to be utilized in the field of agriculture and livestock farming as fertilizer for spreading or in animal feed. Indeed, the chemical composition of fermented molasses, despite a depletion in compounds due to the fermentation, still makes it attractive in feed for ruminants both in terms of the energy provided thereby, and the nitrogen value thereof.

It is therefore to the Applicant's credit, by proposing a compressed solid composition for non-oral use comprising fermented molasses as binder and/or disintegrant, to have opened up a novel way for utilizing fermented molasses, by going against that which was conventionally practised for the use thereof.

DETAILED DESCRIPTION

For the purposes of the present invention, compressed solid composition is intended to mean any composition that may be obtained by the processes of compression known to those skilled in the art, such as, for example, pressure compaction, pelletization, granulation, nodulizing, extrusion or else spray-drying. The compressed solid composition according to the invention may therefore also be considered to be an agglomerate.

The compressed solid composition according to the invention may be in a multitude of compressed forms, said forms conventionally being adapted by those skilled in the art depending on the desired application. Thus, the compressed solid composition may be in the form of a single-layer or multi-layer tablet, a cake, a compressed tablet, granules, a pellet or else a lozenge. Preferably, the compressed solid composition is in the form of a single-layer or multi-layer tablet.

For the purposes of the present invention, non-oral use is intended to mean that the compressed solid composition is not intended to be ingested by an animal or human and therefore especially cannot provide food for animals or humans.

For the purposes of clarification, the terms "compressed" "compacted" or else "agglomerated" are indeed considered to be synonyms for the purposes of the present invention and may be used without distinction.

Fermented molasses are a co-product of molasses obtained after fermentation thereof by bacteria, yeasts, or fungi, said fermentation making it possible to obtain products referred to as "valuable" such as baker's yeast, ethyl alcohol or else citric and glutamic acid. Preferably, fermented molasses is obtained by fermentation of molasses by yeasts.

According to the invention, the fermented molasses may equally be obtained from beet molasses, cane molasses, or a mixture of beet molasses and cane molasses. For example, the mixture may contain up to 60% of fermented beet molasses, up to 70% of fermented beet molasses, up to 80% of fermented beet molasses, up to 90% of fermented beet molasses, or even up to 95% of fermented beet molasses. Advantageously, when the fermented molasses are a mixture of fermented beet and cane molasses, said mixture contains 90% of fermented beet molasses.

Initially, the fermented molasses contain more than 90% of water, but this is advantageously concentrated in order to reduce the amount of water and to obtain higher solids contents.

Thus, the solids content of the fermented molasses or of the mixture of beet molasses and cane molasses according to the invention may be from 50% to 80%. Preferably, the solids content of the fermented molasses is from 55% to 75%, and most particularly from 55% to 65%, such as, for example, approximately 60%.

Conventionally, since they are intended, or were used, as fertilizer or in animal feed, fermented molasses are also defined by the distribution of nitrogen-based materials therein, and by the aminogram thereof. The fermented molasses according to the invention may therefore have a distribution of nitrogen-based materials as below:

- nitrogen from total amino acids: 25% to 50% of the total nitrogen
- nitrogen from betaine: 0% to 40% of the total nitrogen
- ammoniacal nitrogen: 2% to 3% of the total nitrogen.

Regarding the aminogram of the proteins of the fermented molasses according to the invention, the mean contents of amino acids may be those presented below, the ranges of values being given in g/kg of solids:

- Aspartic acid: 6-8
- Threonine: 0.5-3
- Serine and glutamic acid: 115-130
- Proline: 3-4

Glycine: 4-5
Alanine: 2.5-3.5
Valine: 2.5-3.5
Methionine and cysteine: 0.5-3
Isoleucine: 1.5-2.5
Tyrosine: 2-3.5
Leucine: 3-4.5
Phenylalanine: 1-2
Lysine: 0.5-2.5
Histidine: 0.5-2
Arginine: 0.2-1

As co-product resulting from fermentation, fermented molasses have a low sugar content. "Low sugar content" is intended to mean fermented molasses comprising less than 5%, less than 4%, less than 3%, less than 2%, and most particularly less than 1% by weight of sugars relative to the total weight of dry extract. Preferentially, the fermented molasses according to the invention do not contain sugars.

The fermented molasses according to the invention, also termed crude fermented molasses, may undergo one or more chemical or physico-chemical treatments. For example, the fermented molasses may undergo potash removal or demineralization. Such treatments may modify the composition in terms of nitrogen-based materials of the fermented molasses. A potash removal treatment consists, for example, of acidification of the crude fermented molasses by a solution of $H_2SO_4$, followed by neutralization with aqueous ammonia.

The treatments which may be applied to the fermented molasses qualitatively and quantitatively vary the mineral content. Thus, crude fermented molasses may have a crude ash content of 14% to 22% by weight relative to the crude product and a potassium content of 5% to 18% by weight relative to the crude product. On the other hand, in the case of the fermented molasses which have had the potash removed or which have been demineralized, the crude ash content ranges from 5% to 14% by weight relative to the crude product and the potassium content is generally less than 4% by weight relative to the crude product.

Due to a high ash content, the crude fermented molasses have a density which may range from 1.10 to 1.50. Preferably, the density of the fermented molasses is 1.20 to 1.40, and most particularly 1.25 to 1.35.

The fermented molasses according to the invention have a viscosity of 500 mPa·s to 5000 mPa·s, preferably of 1000 mPa·s to 4000 mPa·s, and a slightly acidic pH of 5 to 6.

The compressed solid composition in accordance with the invention thus comprises crude or demineralized fermented molasses as binder and/or disintegrant.

Said fermented molasses are present within the compressed solid composition in effective proportions. Effective proportions are intended to mean those sufficient to obtain the desired effect, namely obtaining a compressed solid composition which may especially be transported, handled and/or stored without substantial damage and which may disintegrate on contact with a liquid such as water.

Advantageously, the amounts of crude or demineralized fermented molasses used within the compressed solid composition according to the invention may be from 0.1% to 15% by weight, preferentially from 0.5% to 5% by weight, and even more preferentially from 0.5% to 1.5% by weight relative to the total weight of the compressed solid composition.

The binding properties thus brought to light of the fermented molasses make it possible to obtain a compressed solid composition having sufficient mechanical strength to avoid the problems of formation of fine particles during handling thereof. Advantageously, the fermented molasses also act as disintegrant, enabling the compressed solid composition to disintegrate on contact with a liquid, and especially on contact with water.

By means of the compressed solid compositions according to the invention, the inventors have thus identified a novel pathway for utilizing fermented molasses but also an alternative to using synthetic binders or binders that are not conventionally used to obtain solid compositions. By way of example, mention will especially be made of polyethylene glycol, polyvinylpyrrolidone, ethoxylated fatty alcohols, starch, hydroxyethyl cellulose, gelatin or else microcrystalline cellulose.

Thus, the compressed solid composition comprising fermented molasses according to the invention may not contain polyethylene glycol and/or polyvinylpyrrolidone and/or ethoxylated fatty alcohols and/or starch and/or hydroxyethyl cellulose and/or gelatin and/or microcrystalline cellulose.

According to a particular embodiment, the fermented molasses may have substances added thereto, in order especially to exhibit particular physical properties. Thus, the molasses may have a compound added thereto, chosen from the group comprising cellulose-based derivatives such as carboxymethylcellulose, hemicelluloses, lignins, ethyl cellulose, methyl cellulose, hydroxypropyl cellulose, hydroxypropyl methyl cellulose, derivatives from starch production such as wheat, corn, cassava, tapioca, potato, or rice starch, dextrins and other modified starches, dextrans, sugar derivatives such as glucose, fructose, lactose, sucrose, sorbitol, glycerol, natural gums of diutan, gelan, xanthan, carrageenan type, pectins, alginates, chitosan, gum arabic, gum tragacanth, carob gum, acacia gum, agar agar, guar gum, production derivatives such as beet pulps, chicory pulps, dried or non-dried apple pomace, sugar cane bagasse, citrus pulps, fruit juice waste, waste from gum production, waste from starch production, mineral derivatives, smectites, bentonites and other silica-derived clays, lime, magnesium, and others from the same family and also mixtures of several of these compounds. Preferably, the fermented molasses have carboxymethylcellulose added thereto. The amounts of compounds to be added to the fermented molasses may be between 0.1% to 2%, preferentially from 0.1% to 1%, more preferably still from 0.1% to 0.5%, the percentages being expressed as dry weight relative to the total dry weight of the fermented molasses with substances added thereto.

The compressed solid composition may also comprise one or more additives. The additives may be chosen from additives known to those skilled in the art, such as, for example, effervescent agents, detergents, sequestrants, pelletizing additives, whitening agents, polymers, surfactants, flow agents, stabilizers, anti-foaming agents, dyes, or else lubricants.

As examples of stabilizers, mention may be made of esters of para-hydroxybenzoic acid, such as methylparaben and propylparaben, alcohols such as chlorobutanol, benzyl alcohol and phenylethyl alcohol, phenols such as phenol and cresol, sulfite salts such as sodium bisulfite and sodium sulfite, edetic acid salts, such as sodium edetate and tetrasodium edetate, and hydrogenated oils, sesame oil, sodium chondroitin sulfate, dibutylhydroxytoluene, adipic acid, ascorbic acid, esters of stearyl-L-ascorbate, sodium L-ascorbate, L-aspartic acid, sodium L-aspartate, sodium acetyl tryptophan, acetanilide, a solution of aprotinin, aminoethylsulfonic acid, aminoacetic acid, DL-alanine, L-alanine, benzalkonium chloride, sorbic acid.

As examples of lubricants, mention may be made of stearic acids such as stearic acid, calcium stearate and magnesium stearate, waxes such as white beeswax and carnauba wax, sulfates such as sodium sulfate, silicic acid compounds such as magnesium silicate and light silicic anhydride, lauryl sulfates such as sodium lauryl sulfate, cocoa butter, carmellose calcium, carmellose sodium, callopeptide, hydrated silicon dioxide, hydrated amorphous silicon oxide, dry aluminium hydroxide gel, glycerol, light liquid paraffin, hydrogenated oil, synthetic aluminium silicate, sesame oil, wheat starch, talcum, macrogols, phosphoric acid.

As examples of detergents, mention may be made of polyacrylates, acrylic/maleic copolymers, monomeric polycarbonates such as citrates, gluconates, oxydisuccinates, glyceryl mono-, di- and trisuccinates, carboxymethyl oxysuccinates, carboxymethyl oxymalonates, dipicolinates and hydroxyethyliminodiacetates.

According to a particular embodiment, the compressed solid composition may also comprise at least one active substance, at least one filler and optionally at least one additive, which may be chosen from effervescent agents, detergents, sequestrants, pelletizing additives, whitening agents, polymers, surfactants, flow agents, stabilizers, antifoaming agents, dyes or else lubricants. According to this particular embodiment, the compressed solid composition may be in tablet form and has an application in the field of household, agricultural and industrial washing and/or cleaning. By way of example of household washing and/or cleaning, mention may be made of machine washing, such as, especially, washing within a dishwasher.

According to a particular embodiment, the compressed solid composition for non-oral use according to the invention has a friability of between 5% and 15%, preferably of between 5% and 11%, and most particularly of between 6% and 8%.

According to a particular embodiment, the compressed solid composition for non-oral use according to the invention has a hardness of between 50 N and 90 N, preferably of between 60 N and 80 N, and most particularly of between 70 N and 75 N.

According to a particular embodiment, the compressed solid composition for non-oral use according to the invention has a dust content (dust area) of less than 3, preferably less than 2.5, and most particularly less than 2.

According to another particular embodiment, the compressed solid composition for non-oral use in accordance with the invention may be packaged in bags in order to protect it from moisture and to provide additional protection for handling and/or transport and/or storage. Advantageously, the bag is a biodegradable and/or water-soluble bag.

According to another particular embodiment, the compressed solid composition comprising fermented molasses as binder and/or disintegrant is in the form of an effervescent cleaning cake for toilets, of dishwasher tablets, of calcium hypochlorite tablets for swimming pools, or of granulated fertilizer.

By way of examples of compressed solid composition that may be in the form of a multi-layer tablet, and especially a multi-layer dishwasher tablet, mention will be made of the composition summarized in the table below:

| | Components | % |
|---|---|---|
| Layer 1 | Sequestrant | 20-60 |
| | Fermented molasses (with or without substances added thereto) | 0.5-5 |

-continued

| | Components | % |
|---|---|---|
| | Alkaline agent | 30-50 |
| | Filler | 0-30 |
| | Surfactant | 0-10 |
| | Polymer | 0-10 |
| | Dye | 0-1 |
| | Pelletizing additive | 0-5 |
| | | 100.00 |
| Intermediate layer 2 | Sequestrant | 30-60 |
| | Whitening agent | 25-50 |
| | Surfactant | 0-10 |
| | Polymer | 0-10 |
| | Pelletizing additive | 0-5 |
| | | 100.00 |
| Layer 3 | Sequestrant | 20-60 |
| | Fermented molasses (with or without substances added thereto) | 0.5-5 |
| | Alkaline agent | 30-50 |
| | Filler | 0-30 |
| | Polymer | 0-10 |
| | Surfactant | 0-10 |
| | Activator | 0-5 |
| | Enzyme | 0-30 |
| | Dye | 0-1 |
| | Pelletizing additive | 0-5 |
| | | 100.00 |

Another subject of the invention relates to the use of fermented molasses as binder and/or disintegrant for the production of a compressed solid composition for non-oral use.

The fermented molasses are as defined above. The use of the fermented molasses as binder and/or disintegrant within a compressed solid composition is doubly advantageous. Firstly, the use according to the invention makes it possible to propose a novel way of utilizing molasses, which were hitherto solely intended for spreading or animal feed. Secondly, the use according to the invention enables the substitution of the conventionally used synthetic binders and thereby makes it possible to obtain compressed solid compositions which are more environmentally friendly.

The amounts of fermented molasses used within the compressed solid composition may be from 0.1% to 15% by weight, preferentially from 0.5% to 5% by weight, and even more preferentially from 0.5% to 1.5% by weight relative to the total weight of the compressed solid composition.

The compressed solid composition may be as defined above and may be in the form of a single-layer or multi-layer tablet, a cake, a compressed tablet, granules, a pellet or else a lozenge. Preferably, the compressed solid composition is in the form of a single-layer or multi-layer tablet.

Another subject of the invention relates to a binding and/or disintegrating composition comprising at least fermented molasses as binder.

The fermented molasses in accordance with the invention may also be used as is within a binding and/or disintegrating composition containing one or more other constituents of all types, including those with a binding character, or those able, for example, to increase the mechanical strength of the final product, especially an agglomerate, or to minimize the phenomena of crumbling to which said agglomerate may be subject during the handling or storage thereof. The fermented molasses are as defined above.

According to a particular embodiment, the binding composition according to the invention may also comprise a hardening agent, that is to say which is able to further improve the binding power.

According to a particular embodiment, the fermented molasses may have substances added thereto, in order especially to exhibit particular physical properties. Thus, the molasses may have a compound added thereto, chosen from the group comprising cellulose-based derivatives such as carboxymethylcellulose, lignins, hemicelluloses, ethyl cellulose, methyl cellulose, hydroxypropyl cellulose, hydroxypropyl methyl cellulose, derivatives from starch production such as wheat, corn, cassava, tapioca, potato, or rice starch, dextrins and other modified starches, dextrans, sugar derivatives such as glucose, fructose, lactose, sucrose, sorbitol, glycerol, natural gums of diutan, gelan, xanthan, carrageenan type, pectins, alginates, chitosan, gum arabic, gum tragacanth, carob gum, acacia gum, agar agar, guar gum, production derivatives such as beet pulps, chicory pulps, dried or non-dried apple pomace, sugar cane bagasse, citrus pulps, fruit juice waste, waste from gum production, waste from starch production, mineral derivatives, smectites, bentonites and other silica-derived clays, lime, magnesium, and others from the same family and also mixtures of several of these compounds.

Another subject of the invention relates to a process for producing a compressed solid composition for non-oral use, comprising the following steps:

1) providing an active substance, a filler and optionally at least one additive chosen from effervescent agents, detergents, sequestrants, pelletizing additives, whitening agents, polymers, surfactants, flow agents, stabilizers, anti-foaming agents, dyes or else lubricants,
2) incorporating fermented molasses to the compounds provided in the preceding step, in order to obtain a mixture,
3) compacting said mixture in order to obtain said compressed solid composition.

The first step of the process therefore consists in providing an active substance, a filler and optionally at least one additive chosen from effervescent agents, detergents, sequestrants, pelletizing additives, whitening agents, polymers, surfactants, flow agents, stabilizers, anti-foaming agents, dyes or else lubricants. The active substance and the filler are chosen by those skilled in the art depending on the desired application for the compressed solid composition.

The fermented molasses are then incorporated, according to a second step, into the compounds provided according to the first step of the process, so as to obtain a mixture. The fermented molasses are as defined above, namely especially the co-product obtained by fermentation of the molasses. The amounts of molasses to be incorporated according to this step may be from 0.1% to 15% by weight, preferentially from 0.5% to 5% by weight, and even more preferentially from 0.5% to 1.5% by weight relative to the total weight of the mixture.

The step of incorporation may be performed via techniques that are known to those skilled in the art and which lead to obtaining a mixture. Thus, the step of incorporation may for example be obtained by spraying.

Finally, the third step of the process according to the invention consists of a step of compacting, which may be carried out according to techniques known to those skilled in the art and which lead to the compression or agglomeration of the mixture prepared in the previous step. Thus, the step of compacting may for example be carried out by pressure compaction on a rotary press, by pelletization, by granulation, by nodulizing, by extrusion or else by spray-drying. By way of example, the step of compacting by pressure compaction may be carried out via a rotary press. The step of compacting thus makes it possible to obtain a compressed solid composition which may be in several forms, such as, for example, a single-layer or multi-layer tablet, a cake, a compressed tablet, granules, a pellet or else a lozenge.

The process according to the invention may also comprise a step of drying after the step of incorporation and/or of compacting.

The invention will be better understood using the following examples which are purely illustrative and in no way limit the scope of protection.

Examples

In the following examples, the mechanical properties were measured with the following methods:

Friability test: This test consists in measuring the loss of mass of the compressed solid composition after rotation in a drum at 25 revolutions/min for 2 minutes. This test is carried out using the FT2 machine supplied by SOTAX. The friability is determined according to the formula below:

$$F(\%)=[m1-m2)/(m1)]\times 100$$

in which m1 corresponds to the mass of the composition before the rotation, and m2 to the mass of the composition after rotation.

Disintegration: This test consists in measuring the disintegration time of the compressed solid composition in a liquid medium. The test is carried out by an apparatus that performs back-and-forth movements while fully submerged. For this purpose, the compressed solid composition is placed in a basket and undergoes 60 back-and-forth movements per minute in a vessel filled with water heated to 30° C.±1° C.

The first back-and-forth movement corresponds to $T_0$ and when there is no longer any compressed solid composition residue left in the basket, the time which has passed since $T_0$ corresponds to the disintegration time. The disintegration time value is given in minutes and corresponds to the mean of 5 measurements.

Hardness: The hardness is calculated using a Synergie 100 tensile testing machine (MTS) and the Test Works 4 software, and corresponds to the force required to break the compressed solid composition. The hardness is expressed in Newtons (N) and corresponds to the mean of 5 measurements.

Dust content: The measurement is carried out using the DustMon L machine and the DustMon L software, according to the manufacturer's recommendations. The measurement consists in evaluating the concentration of dust of a mass of compressed solid composition when dropped, as it passes in front of a laser beam. The value is given in "dust area".

Solids content: Karl Fischer method.

Example 1: Preparation of a Compressed Solid Composition for Non-Oral Use, Comprising Fermented Molasses as Binder and/or Disintegrant For this example, the compressed solid composition is in the form of a multi-layer tablet composed of a first layer, an intermediate layer and a third layer.

A mixture of fermented beet and cane molasses is used. The mixture contains approximately 90% of fermented beet molasses and approximately 10% of fermented cane molasses. The fermented molasses have a solids content of 60%. These fermented molasses then have carboxymethylcellulose added thereto at an amount (dry/dry) of 0.2%.

The fermented molasses with carboxymethylcellulose added thereto are mixed at an amount (dry/dry) with other compounds in order to obtain the first and third layers of the tablet. The compositions of all the layers of the tablet are summarized below:

| | Components | % |
|---|---|---|
| Layer 1 (6 g) | Sequestrant | 35 |
| | Fermented molasses with substances added thereto | 0.5 |
| | Alkaline agent | 40 |
| | Filler | 10 |
| | Surfactant | 5 |
| | Polymer | 5 |
| | Dye | 0.5 |
| | Pelletizing additive | 4 |
| | | 100.00 |
| Intermediate layer 2 (6 g) | Sequestrant | 50 |
| | Whitening agent | 30 |
| | Surfactant | 8 |
| | Polymer | 9 |
| | Pelletizing additive | 3 |
| | | 100.00 |
| Layer 3 (4 g) | Sequestrant | 32 |
| | Fermented molasses with substances added thereto | 0.5 |
| | Alkaline agent | 40 |
| | Filler | 10 |
| | Polymer | 5 |
| | Surfactant | 5 |
| | Activator | 3 |
| | Dye | 0.5 |
| | Pelletizing additive | 4 |
| | | 100.00 |

Each composition is then compacted one to the other using a rotary press so as to obtain a compressed solid composition in the form of a multi-layer tablet.

The mechanical properties of said tablet were measured according to the protocols described above and the results are presented in table 1 below:

TABLE 1

| | Multi-layer tablet |
|---|---|
| Friability (%) | 7.1 |
| Disintegration (min) | 10 |
| Hardness (N) | 71 |
| Dust content | 1.7 |

The compressed solid composition according to the invention has good mechanical properties and may thus be readily handled and transported without being broken or generating large amounts of fines. It also has a disintegration time which is compatible with applications in the field of cleaning, for which disintegration times of less than 12 min (based on the protocol described above) are generally desired.

Comparative Example 1: Preparation of a Compressed Solid Composition for Non-Oral Use, Comprising Polyethylene Glycol (PEG) as Binder and/or Disintegrant In order to compare the properties obtained and to demonstrate the advantage of the compressed solid compositions comprising fermented molasses as binder and/or disintegrant, a second multi-layer tablet was prepared.

Polyethylene glycol is mixed at an amount (dry/dry) with other compounds in order to obtain the first and third layers of the tablet. The compositions of all the layers of the tablet are summarized below:

| | Components | % |
|---|---|---|
| Layer 1 (6 g) | Sequestrant | 35 |
| | Polyethylene glycol | 2 |
| | Alkaline agent | 40 |
| | Filler | 10 |
| | Surfactant | 5 |
| | Polymer | 3.5 |
| | Dye | 0.5 |
| | Pelletizing additive | 4 |
| | | 100.00 |
| Intermediate layer 2 (6 g) | Sequestrant | 50 |
| | Whitening agent | 30 |
| | Surfactant | 8 |
| | Polymer | 9 |
| | Pelletizing additive | 3 |
| | | 100.00 |
| Layer 3 (4 g) | Sequestrant | 32 |
| | Polyethylene glycol | 2 |
| | Alkaline agent | 40 |
| | Filler | 10 |
| | Polymer | 3.5 |
| | Surfactant | 5 |
| | Activator | 3 |
| | Dye | 0.5 |
| | Pelletizing additive | 4 |
| | | 100.00 |

Each composition is then compacted according to the same protocol as example 1 using a rotary press so as to obtain a compressed solid composition in the form of a multi-layer tablet.

The mechanical properties of said tablet were measured according to the same protocols as example 1 and the results are presented in table 2 below:

TABLE 2

| | Comparative multi-layer tablet |
|---|---|
| Friability (%) | 3 |
| Disintegration (min) | 8 |
| Hardness N | 75 |
| Dust content | 2 |

The mechanical properties obtained with "conventional" PEG-based compressed solid compositions are thus comparable with the compressed solid compositions according to the invention based on fermented molasses as binder and/or disintegrant.

Thus, as demonstrated by this comparison, the use of fermented molasses according to the invention as binder and/or disintegrant is also a good alternative to the conventionally used chemical binders, while enabling a novel way to utilize a product hitherto solely intended for spreading or animal feed.

Example 2: Demonstration of the Binding Effect of the Fermented Molasses According to the Invention The aim of this example is to demonstrate the good binding properties of the fermented molasses according to the invention.

A—Products Used:

Carbon black: ENSACO® (Imerys); particle size distribution: Dv10=3.15 μm; Dv50=11.8 μm; Dv90=33.7 μm.

Binder solution 1: fermented cane molasses having a solids content of 60%.

Binder solution 2: mixture containing 90% fermented beet molasses and 10% fermented cane molasses, and having a solids content of 60%.

Binder solution 3 (control): Bretax C (lignosulfonate, Burgo). Bretax C is a known commercially available binder.

Each of the binder solutions is used so as to be sprayed onto the carbon black and enable the granulation thereof.

B—Dry Granulation

The carbon black is placed in the (51) vessel of a pilot shear mixer within which the stirring member is set to rotate.

For each binder solution, an amount by weight of 5% by weight relative to the weight of the carbon black is sprayed inside the vessel using a bi-fluid nozzle so as to enable the granulation of the carbon black.

The parameters of the pilot mixer are as follows:

Linear speed: 14.1 m/s,

Spraying rate: 5 g/min,

Pulsed pressure: 0.1 bar.

The different tests performed are summarized in table 3 below:

TABLE 3

| Tests | Mass of carbon black (g) | Binder solution sprayed | Mass of solution sprayed (g) | Duration of mixing (s) |
|---|---|---|---|---|
| 1 | 300 | Binder solution 1 | 15.8 | 282 |
| 2 | 300 | Binder solution 2 | 15.8 | 280 |
| 3 | 300 | Binder solution 3 | 15.8 | 252 |

C—Particle Size Analyses:

For each of the tests, the granules of carbon black obtained were analysed by laser particle size analysis in order to analyse the effect of each binder solution.

Apparatus Used for the Measurement:

Mastersizer 3000 (Malvern)

Aero S accessory.

Operation Parameters:

Dry route,

Pressure: 0.5 bar,

Blank measurement time: 30 seconds,

Measurement time: 60 seconds.

D—Results of the Particle Size Analyses:

TABLE 4

| | Particle size parameter | | |
|---|---|---|---|
| | Dv10 (μm) | Dv50 (μm) | Dv90 (μm) |
| Crude ENSACO ® carbon black | 3.15 | 11.8 | 33.7 |
| Test 1 | 3.87 | 15.5 | 44.9 |
| Test 2 | 4.03 | 16.3 | 71.8 |
| Test 3 | 3.73 | 15.5 | 43.2 |

In comparison with a control binder solution, the results demonstrate that the fermented molasses according to the invention makes it possible to obtain a binding effect on the carbon black which is just as effective (test 1 vs test 3) or even more effective (test 2 vs test 3).

This example thus demonstrates the very good binding properties of the fermented molasses according to the invention and the fact that the latter may advantageously be used in compressed solid compositions as binder.

Example 3: Demonstration of the Binding and Disintegrating Effect of the Fermented Molasses According to the Invention The fermented molasses is used in this example to granulate a powder of fermented cane molasses. The products used are summarized below:

A—Products Used:

Fermented cane molasses powder having a solids content of 97%.

Fermented molasses 1: fermented cane molasses having a solids content of 60%.

Fermented molasses 2: mixture of fermented beet and cane molasses. The mixture contains approximately 90% of fermented beet molasses and approximately 10% of fermented cane molasses. The fermented molasses has a solids content of 60%. This fermented molasses then has carboxymethylcellulose added thereto at an amount (dry/dry) of 0.2%.

The fermented molasses 1 and 2 are used as binding and/or disintegrating composition on the fermented cane molasses powder. The fermented molasses are used to granulate the powder, and to thus obtain compressed solid compositions. The granules obtained were then analysed.

B—Particle Size Analysis:

Apparatus used for the laser particle size measurement: Mastersizer 3000 (Malvern), as above.

The fermented cane molasses powder was analysed by laser particle size analysis and has the following characteristics:

Dv10=18.1 μm,

Dv50=77.5 μm,

Dv90=234 μm, distribution width (span)=2.788.

C—Tests Performed

Test 1:

For this test, the granulation is carried out on a wet granulator (model VG-25, GLATT), according to the following conditions:

TABLE 5

| | |
|---|---|
| Compressed air pressure (bar) | 1.5 |
| Pump setting Masterflex L/S 18 tubing | 4 ml/min |
| Mixer (rpm) | 500 |
| Grinder (rpm) | 1000 |
| Jacketed cryostat ° C. | 15 |

1501.4 g of fermented cane molasses powder is placed within the granulator.

The granulation is then carried out with 10% by weight of a liquid solution of molasses 1 relative to the weight of powder. The amount of solution sprayed is 150 g and the content of liquid solution of molasses 1 sprayed/crude fermented cane molasses powder is 10%.

Analysis of the Granules Obtained:

The granules obtained were analysed under the same conditions as the fermented cane molasses powder and have the following characteristics:

Dv10=62.4 μm,

Dv50=166 μm,

Dv90=629 μm, distribution width (span)=3.442.

In comparison with the powder, these particle size values show that the fermented molasses has a binding effect and makes it possible to obtain compressed solid compositions in granule form.

Test 2:

For this test, the granulator is the same as that of test 1 and the operating conditions are the same, with the exception of the mixer setting, which is set to 600 rpm.

1500 g of fermented cane molasses powder is placed within the granulator and the granulation is carried out with 5% of a liquid solution of molasses 2. The amount of solution sprayed is 75 g and the content of solution sprayed/crude cane molasses powder is 5%.

Analysis of the Granules Obtained:

The granules obtained were analysed under the same conditions as the fermented cane molasses powder and has the following characteristics:

Dv10=55.4 μm,

Dv50=127 μm,

Dv90=305 μm, distribution width (span)=1.965.

In comparison with the powder, these particle size values show that the fermented molasses has a binding effect and makes it possible to obtain compressed solid compositions in granule form. The distribution width here is less than the powder, reflecting a more centred size distribution of the particles of the granules.

B—Wettability Test

The wettability of the granules obtained in tests 1 and 2 is compared to that of the fermented cane molasses powder according to the following protocol:

- Place 100 ml of distilled water at 20° C. in a 400 ml beaker,
- Take 10 g of the sample and place it on the surface of the water at the same time as starting the timer,
- Stop the timer when the sample is entirely wetted.

The results are presented below in table 6:

TABLE 6

| | Duration (s) |
|---|---|
| Fermented cane molasses powder | 115 |
| Granules of test 1 | 8 |
| Granules of test 2 | 5 |

The duration here expresses the time required by the different samples to succeed in passing the air/water interface.

The results show that the granules obtained have a significant reduction in wettability. The fermented molasses according to the invention makes it possible to improve this parameter and thereby demonstrate the good binding properties.

C—Disintegration Test

The disintegration test is carried out on the granules obtained in the preceding tests 1 and 2 in order to highlight the disintegrating effect of the fermented molasses. The test is carried out according to the following protocol:

- Sample 10 g of the sample to be tested and sieve is to as to recover the 180-125 μm sieved fraction,
- Take the sieve comprising the 180-125 μm sieved fraction and place it above a 21 beaker,
- Add 400 ml of distilled water at 20° C. so that the sieve dips into the surface,
- Stir at approximately 300 rpm.

The change in the weight of the combined mixture is monitored over time from as soon as the first ml of distilled water are added. This makes it possible to reflect the decrease in the weight of the sample as a function of time.

The results are presented in table 7 below:

TABLE 7

| Time (s) | Fermented cane molasses powder | Granules of test 1 | Granules of test 2 |
|---|---|---|---|
| 10 | | 3.1 | 1.4 |
| 20 | | 2.7 | |
| 30 | −0.5 | 1.2 | |
| 50 | | 0.3 | |
| 60 | −5.2 | −1.7 | −1.2 |
| 90 | −8.4 | −2.2 | −3.1 |
| 120 | −9.2 | −2.9 | −5.8 |
| 150 | −10.5 | −4.5 | −6.7 |
| 180 | −10.6 | −5.2 | −7.4 |
| 210 | End of test (0 g) | −5.9 | −8.2 |
| 270 | | −6.6 | −9.2 |
| 330 | | −7.4 | End of test (0 g) |
| 390 | | −7.9 | |
| 450 | | −8.5 | |
| 510 | | End of test (0 g) | |

The positive values at the start of the test reflect the absorption of water by the granules. Over time, the results show that, under the action of water, the granules obtained from the fermented molasses according to the invention may entirely disintegrate, thereby demonstrating the disintegrating effect of said fermented molasses.

In conclusion, this example thus demonstrates the binding and disintegrating properties of the fermented molasses according to the invention. Indeed, the use thereof makes it possible to obtain compressed solid compositions in granule form, said granules being able to subsequently disintegrate under the action of water.

The invention claimed is:

1. A composition for non-oral use, comprising fermented molasses as binder and disintegrant, an active substance and optionally at least one additive chosen from fillers, effervescent agents, detergents, sequestrants, pelletizing additives, whitening agents, polymers, surfactants, flow agents, stabilizers, anti-foaming agents, dyes, and lubricants, wherein the active substance comprises a powder of fermented molasses, and wherein said composition is in granule form.

2. The composition for non-oral use according to claim 1, wherein the fermented molasses is obtained by fermentation of beet molasses, cane molasses or a mixture of beet and cane molasses.

3. The composition for non-oral use according to claim 2, wherein the fermented molasses has a solids content of between 50% and 80%.

4. The composition for non-oral use according to claim 2, wherein the fermented molasses comprises less than 5% by weight of sugars relative to the total weight of dry extract.

5. The composition for non-oral use according to claim 2, wherein the fermented molasses has carboxymethylcellulose added thereto.

6. The composition for non-oral use according to claim 5, wherein the amount (dry/dry) of carboxymethylcellulose is from 0.1% to 2%, the percentage being expressed as dry weight relative to total dry weight of the composition.

7. The composition for non-oral use according to claim 5, wherein the amount (dry/dry) of carboxymethylcellulose is from 0.1% to 1%, the percentage being expressed as dry weight relative to total dry weight of the composition.

8. The composition for non-oral use according to claim 5, wherein the amount of carboxymethylcellulose is from 0.1% to 0.5%, the percentage being expressed as dry weight relative to total dry weight of the composition.

9. The composition for non-oral use according to claim 1, wherein the fermented molasses has a viscosity of 500 to 5000 mPa·s.

10. The composition for non-oral use according to claim 1, wherein the active substance is a powder of fermented molasses.

11. The composition for non-oral use according to claim 1, wherein the dye is present in the composition.

12. The composition for non-oral use according to claim 11, wherein the dye is carbon black.

13. The composition for non-oral use according to claim 1, wherein the composition for non-oral use does not contain one or more of polyethylene glycol, microcrystalline cellulose, polyvinylpyrrolidone, starch, hydroxyethyl cellulose, and gelatin.

14. The composition for non-oral use according to claim 1, wherein the fermented molasses comprises less than 1% by weight of sugars relative to the total weight of dry extract.

15. A process of producing a composition for non-oral use in granule form, comprising granulating the composition according to claim 1.

16. The method according to claim 15, wherein the fermented molasses is present in the composition for non-oral use in granule form at an amount by weight of 0.1% to 15% relative to the total weight of the composition.

17. A process for producing a composition for non-oral use in granule form according to claim 1, comprising the following steps:

providing the active substance, and optionally the at least one additive chosen from fillers, effervescent agents, detergents, sequestrants, pelletizing additives, whitening agents, polymers, surfactants, flow agents, stabilizers, anti-foaming agents, dyes or lubricants;

incorporating fermented molasses to the compounds provided in the preceding step, in order to obtain a mixture; and granulating said mixture in order to obtain said composition in granule form.

18. The process according to claim 17, wherein the step of incorporation is carried out by spraying.

19. The process according to claim 17, wherein the step of granulating is carried out on a granulator.

* * * * *